Figure 1:
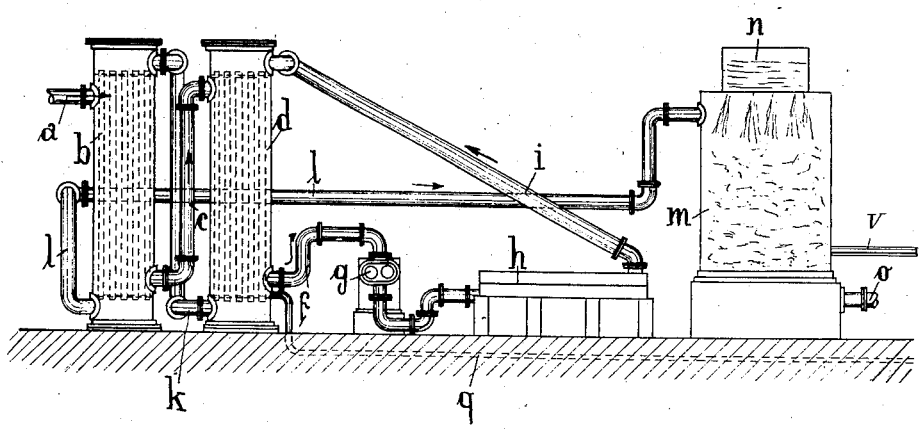

No. 846,035. PATENTED MAR. 5, 1907.
H. KOPPERS.
RECOVERY OF AMMONIA FROM GAS.
APPLICATION FILED SEPT. 2, 1905.

UNITED STATES PATENT OFFICE.

HEINRICH KOPPERS, OF ESSEN-ON-THE-RUHR, GERMANY.

RECOVERY OF AMMONIA FROM GAS.

No. 846,035.     Specification of Letters Patent.     Patented March 5, 1907.

Application filed September 2, 1905. Serial No. 276,906.

*To all whom it may concern:*

Be it known that I, HEINRICH KOPPERS, a citizen of the German Empire, and a resident of Essen-on-the-Ruhr, Germany, have invented certain new and useful Improvements in and Relating to the Treatment of Gases Obtained from the Dry Distillation or Gasification of Fuels, of which the following is a specification.

The present invention has for its object to obtain the by-products contained in the gases of the dry distillation or gasification of fuels—that is to say, tar and ammonia—in a more simple and less costly manner than hitherto, purely and quantitatively, and at the same time to avoid the waste liquids.

The invention is characterized mainly by the fact that the separation of these products from the gas mixture takes place at the degree of temperature which is most appropriate for obtaining them in the desired marketable condition and also that the waste waters are discharged into the atmosphere in a highly-diluted form. The method of procedure adopted is based upon observations and experiments carried out and is normally as follows: The raw gas is greatly cooled in some cases far below its dew or condensation point, when of course a part of the water-vapor is condensed. The dew or condensation point for retort-gas is approximately 72° centigrade, that of coke-oven gas approximately 85° centigrade, (barometer at seven hundred and sixty millimeters.) The difference is caused by the fact that coke-coal is treated with a certain quantity of water (say fourteen per cent.) in opposition to gas-coal. The gas cooled to a temperature between 40° and 45° centigrade is conducted through a tar-separator, in which the tar which has not yet been deposited is separated almost completely as a pure undecomposed mass. The temperature of the gas so purified is then raised to such an extent that it is superheated in accordance with the water that it contains. This heating of the gas is best effected by employing it as cooling medium in one of the coolers for the raw gas coming from the furnace, whereby the excess heat of this latter gas is indirectly transferred to the former. This gas, freed from tar, may then be washed with acid in known appliances, thereby forming a concentrated liquor, as owing to the superheating of the gases the water-vapors contained therein are also superheated. The superheated vapors will not become condensed during the acid treatment, so that the liquor formed is not diluted by any condensation of water. That quantity of water which is deposited owing to the decrease of temperature of the gases and which contains about one-half the total quantity of ammonia, and in this all that ammonia which has already been neutralized in the raw gases by acids—such as sulfuric acid or hydrochloric acid, for example, (up to ten per cent. of the total quantity)—is now advantageously further treated by itself. For example, it is driven off in a separate distillation apparatus of any appropriate construction with lime and steam. The waste gases therefrom, which contain the whole ammonia and which have a temperature of 100° centigrade, enter a saturation-vat which is filled with the liquor produced by washing the gases. It is possible to regulate this quantity proportionately, according as more or less water is sent over the distillation apparatus.

In principle the formation of the ammoniacal salt from the ammonia of the vapors and the sulfuric acid of the bath takes place at any temperature. However, fixed solid marketable ammonia (which is the desired final product) is only formed when the vapors passing through are superheated—that is to say, when no condensation, but, on the contrary, a further vaporization is effected upon entering the bath. The height of this temperature or the percentage of water is ascertainable from the consideration that ammonium sulfate decomposes in neutral solution at temperatures of about 100° centigrade. The lower the temperature in the saturation-bath the less is the danger of small quantities of salt being volatilized from the salt solution. As the waste vapors form a superheated mixture, the formation of the fixed sulfate takes place with certainty in the saturation-bath with acid-sulfate liquor, which is itself preferably maintained at an appropriate temperature, so as to avoid any condensation.

The waste waters of the distillation apparatus invariably contain dissolved tar constituents, especially phenols, and are therefore harmful. They present dilute carbolic-acid solutions which destroy everything. As the prejudicial substances, such as phenols, cannot be precipitated, these waste waters cannot be purified by chemical means. Now in accordance with the process described above by avoiding the introduction of large quantities of fresh water in the process of obtaining the by-products the quantity of these waste materials has already been considerably restricted, as the quantity of liquid remaining over is composed of the moisture contained in the coal (fourteen per cent. of the charge) and of water chemically formed in the distillation, (six per cent. of the charge.) In order to render these quantities of liquid harmless in discharging them freely by diluting as much as possible with water, it would be necessary to employ enormous quantities of water.

In accordance with the present process these waste products, which cannot be destroyed chemically, are discharged for suitable dilution into the other medium which is available—that is to say, into the atmosphere, which is unlimited in amount. This is effected by supplying the waste waters of the distillation apparatus after clarification to the combustion-gases in the chimney, (in a very finely divided state,) so as to vaporize and conduct them into the atmosphere.

The above-described process may be carried out in the apparatus shown in the accompanying drawing, in which—

Figure 2:
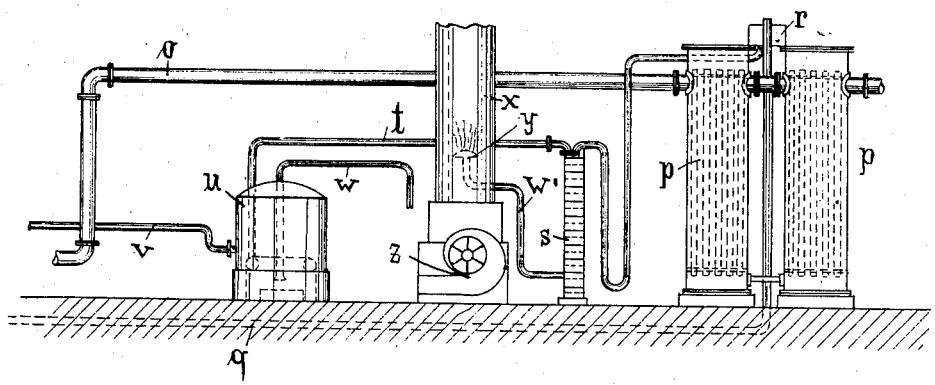

Figures 1 and 2 represent a side elevation of the same, Fig. 2 being the right-hand continuation of Fig. 1.

The hot raw gases of a coke or similar oven enter, through a pipe $a$, the space surrounding the tubes of a cooler $b$ and pass through a pipe $c$ into the corresponding space of a second cooler $d$. A pump $g$ draws the cooled gases through pipe $f$ from cooler $d$ and conveys the same into a tar-separator $h$. The gases so freed from tar enter the tubes of cooler $d$ through pipe $i$ and travel thence through pipe $k$ into the tubes of cooler $b$. In coolers $b$ and $d$ the temperature of the gases is again raised by the hot gases entering through pipe $a$ and surrounding the tubes. After the gases have thus been treated they pass through pipe $l$ into an acid-tower $m$. The latter is filled with coke or similar material, which is continuously showered with acid. The gases thus freed from ammonia are conducted, through pipe $o$, into a cooler $p$ and are then adapted for further use.

The ammonia, which in the raw gas is combined with acid, is absorbed in cooler $d$, together with the water, the liquid separated in $b$ and $d$ being conveyed, through pipe $q$, into receptacle $r$, and thence into a distillation apparatus $s$. In the latter the liquid is driven off with lime and steam, the gases thus generated flowing through pipe $t$ into a saturation-bath $u$. The latter is filled, through pipe $v$, with the liquor formed in acid-tower $m$. The ammonium sulfate, which accumulates at the bottom of receptacle $u$, is continuously withdrawn from the latter by an ejector $w$ or other suitable means. The spent liquor in distillation apparatus $s$ is led through pipe $w'$, having spraying-nozzle $y$, into chimney $x$, the draft in the latter being maintained by blower $z$.

The possibility of carrying the process characterized above into practice industrially, owing to the quantities of free heat present in the process, is shown by examining the theoretical data.

One ton of coal gives three hundred cubic meters of distillation-gas or eighteen hundred cubic meters of combustion-gas. Now one ton of coal furnishes two hundred kilograms of water, so that 0.11 of a kilogram of water corresponds to one cubic meter of combustion-gas. Now one cubic meter of combustion-gas at 300° centigrade contains 1.2 = 300.0.23—that is to say, approximately eighty-three thermal units. One hundred and ten grams of water at 80° centigrade require about sixty-five thermal units for converting them into steam. The atomization of water in the combustion-gas results in complete vaporization or superheating, and accordingly in complete removal.

It is true that the chimney-draft will be impeded to some extent. By providing a blower or similar apparatus, however, it may be reëstablished, so that the chimney may be regarded as a means for vaporizing these vapors and conducting them away.

In addition to the waste heat of the combustion-gases passing off other quantities of heat which are liberated in coking, but which are never or seldom used, may likewise be employed in this vaporization. Thus, for example, the heat of the oven lost by radiation and the heat contained in the hot distillation-gases may be used.

The vapors of the saturation-bath freed from ammonia pass off in the hot gas coming from the scrubbers and are cooled with this latter to atmospheric temperature, when for the first time the water-vapors are completely deposited, this condensate forming a pure water fit for use. The gases themselves do not suffer in this process, so that from them benzol, illuminating-gas, and the like may be formed, as usual.

What I claim is—

The process of obtaining ammonia and tar from gas which consists in cooling the gas to form cooled gas and a condensate, separating the tar from the cooled gas, superheating the gas freed from tar, washing the gas with acid to form a liquor, and mixing said liquor in a saturation-bath with the waste vapors obtained by treating the condensate with lime and steam, substantially as specified.

Signed by me at Düsseldorf, Germany, this 10th day of August, 1905.

HEINRICH KOPPERS.

Witnesses:
WILLIAM ESSENWEIN,
ERNEST ANDRÉ.